March 14, 1950   E. L. GRATE   2,500,818
MOWING ATTACHMENT FOR TRACTORS
Filed Feb. 13, 1948   2 Sheets-Sheet 1
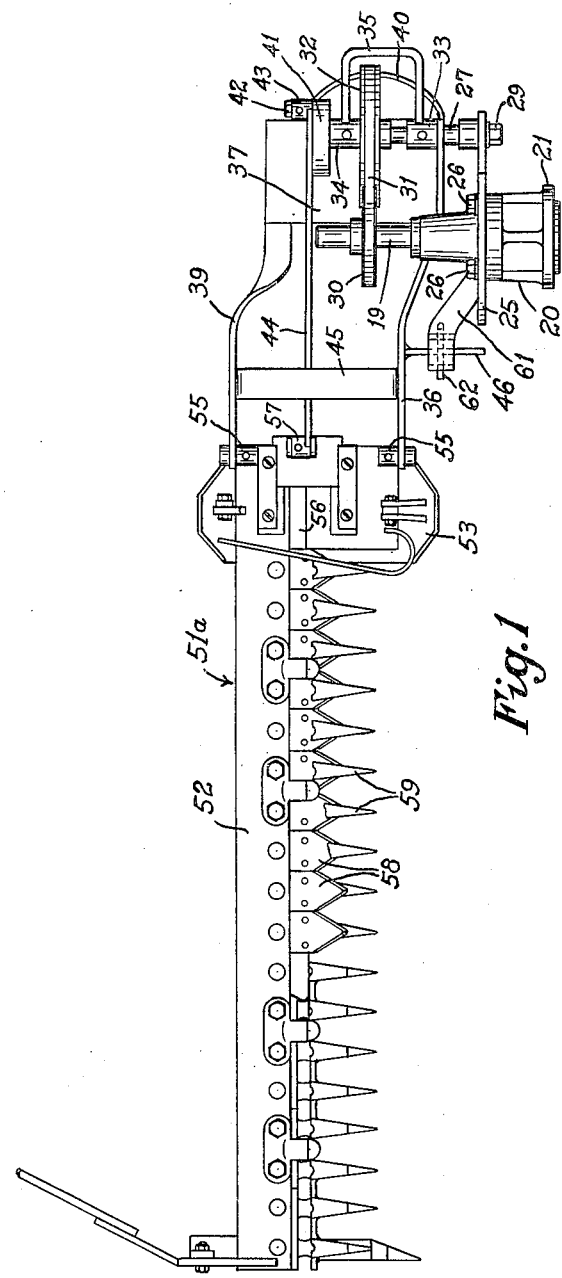
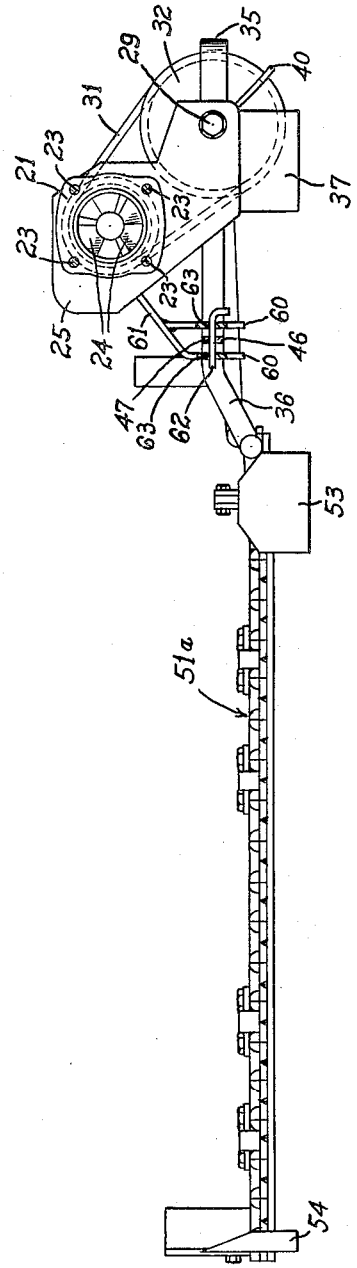
INVENTOR.
Earl L. Grate
BY
ATTORNEYS

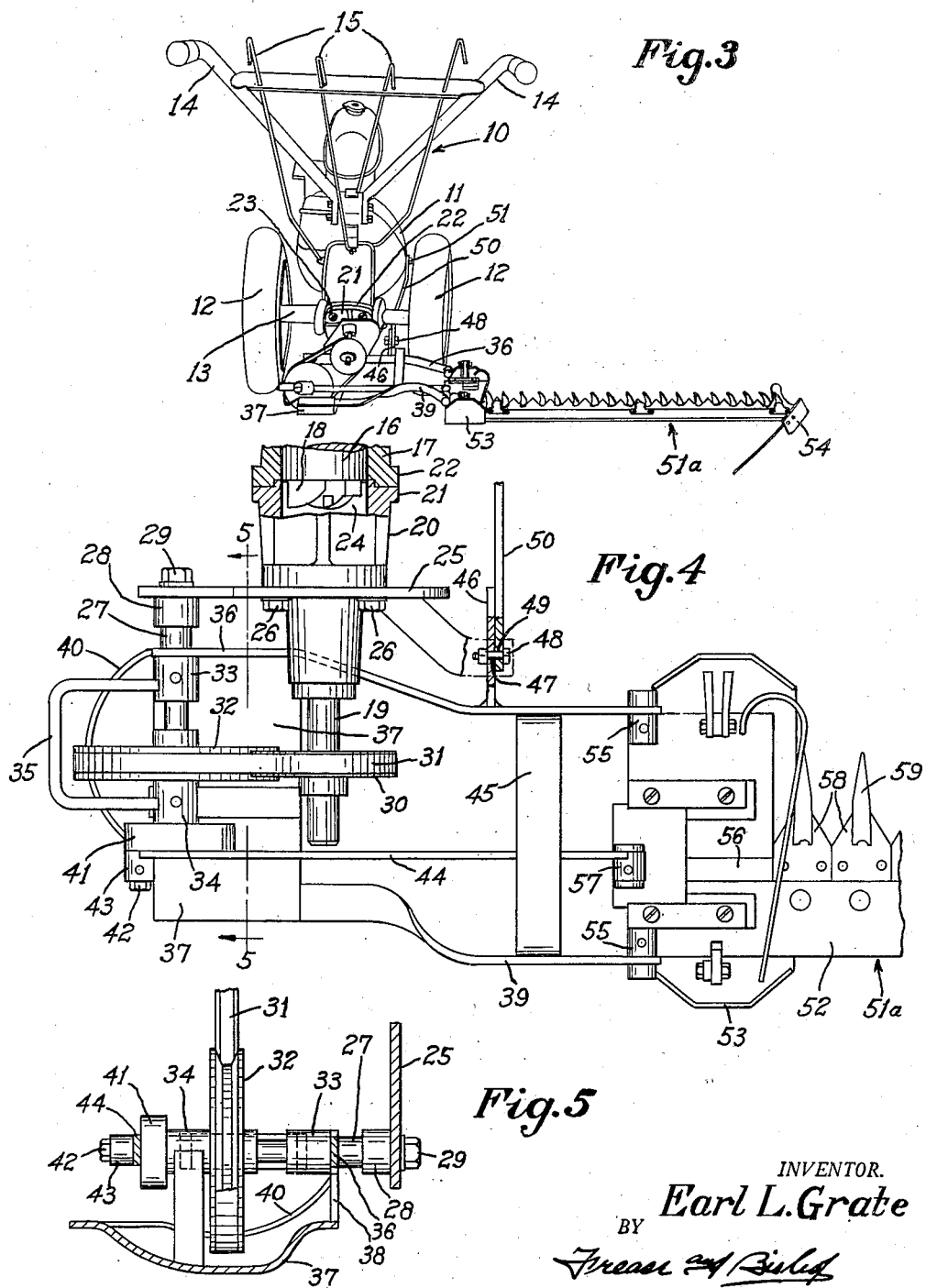

Patented Mar. 14, 1950

2,500,818

UNITED STATES PATENT OFFICE 2,500,818

MOWING ATTACHMENT FOR TRACTORS

Earl L. Grate, Salem, Ohio

Application February 13, 1948, Serial No. 8,050

6 Claims. (Cl. 56—26.5)

The invention relates to means for attaching a reciprocating mower bar to a two-wheeled garden tractor for mowing grass, weeds and the like and more particularly to means for operatively connecting the mower bar to the power take-off of the tractor for operating at the side of the tractor.

Under present practice it is common to provide mower bar attachments in which the mower bar is connected to a supporting arm or plate rigidly mounted upon the tractor. With such a construction difficulty is experienced in the operation of the mowing attachment since this rigid support prevents the mower bar from following the contour of the ground and either dropping into depressions in the ground or riding over projections or obstructions thereon, so that the grass or the like being mowed is not cut to uniform height over the entire field.

Furthermore, with this rigid support for the mower bar, damage may be caused to the teeth of the same by encountering a projection or obstruction upon the ground.

The present invention has for its object to provide an improved, side operating, mower bar attachment, attached to the tractor by means of a hinged or pivoted support which may automatically adjust itself to the contour of the ground over which the tractor is moved so that the mower bar will follow the contour of the ground.

Another object is to provide such an attachment in which the mower bar is hingedly or pivotally connected to the hinged support whereby the mower bar will be floatingly supported upon the ground over which it passes so as to automatically adjust itself to any irregularities in the surface of the ground, permitting either or both ends of the cutter bar to either swing upward over projections or obstructions or downward through depressions as the tractor is moved over the ground.

A further object is to provide means for temporarily holding the hinged support rigid relative to the tractor when it is desired to transport the tractor without operating the mower bar.

A still further object is to provide a torsion bar pivotally connected to the hinged support frame for the mower bar, so as to permit the support frame to have free vertical movement upon the swing pin and at the same time take the strain off of the swing pin and relieve side draft.

The above objects together with others which will be apparent from the drawings and following description, or which may be later referred to, may be attained by constructing the improved mower bar attachment in the manner hereinafter described in detail and illustrated in the accompanying drawings, in which:

Figure 1 is a top plan view of the improved mower bar attachment;

Fig. 2 a rear elevation of the mower bar attachment;

Fig. 3 a rear perspective view of a two-wheeled tractor with the improved mower bar attachment connected thereto;

Fig. 4 an enlarged top plan view of the hinged support frame, showing the connection thereof to the power take-off of the tractor; and Fig. 5 a fragmentary sectional view taken as on the line 5—5, Fig. 4.

Referring now more particular to the embodiment of the invention illustrated in the accompanying drawings, in which similar numerals refer to similar parts throughout the several views, a well-known type of two-wheeled garden tractor is indicated generally at 10 and comprises generally the engine 11, traction wheels 12, axle housing 13 supporting the engine thereon, handles 14, a plurality of controls 15 of usual and well-known construction and arrangement, and a power take-off extending rearwardly of the tractor at a central location between the wheels 12.

The power take-off includes the drive shaft 16 within the housing 17 upon the tractor, said shaft having at its outer end a plurality of drive dogs 18. The mower bar attachment, to which the invention pertains, includes a driven shaft 19 journalled in the housing 20, one end of which has an attaching flange 21 for abutting the attaching flange 22 of the power take-off housing, and adapted to be connected thereto as by cap screws 23. Dogs 24 are provided upon the end of the driven shaft 19, meshing with and driven by the dogs 18 upon the drive shaft of the power take-off.

A support plate 25 is rigidly attached to the housing 20, as by bolts 26, and extends some distance below said housing, and a shaft or swing pin 27 is journalled at one end in the bearing 28, formed upon the plate 25, and is held against lateral movement as by the cap screw 29, located through the plate 25 and engaged in the adjacent end of the shaft 27, whereby the shaft may freely rotate in the bearing 28.

A V-belt pulley 30 is fixed upon the driven shaft 19 and connected by the belt 31 with the pulley 32, which is fixed upon the shaft 27 between the bearings 33 and 34. A U-bar 35 is connected at opposite ends to the bearings 33 and 34 and straddles the pulley 32.

The hinged support frame which carries the mower bar comprises a bar 36 having one end thereof pivotally mounted upon the shaft 27, a shoe 37 for contact with the ground and connected to the bar 36 as at 38, and a bar 39 rigidly connected at one end to the shoe. A wire guard 40 may extend across the under portion of the pulley 32 to prevent grass from becoming tangled around the pulley and belt.

A pitman wheel 41 is fixed upon the shaft 27, adjacent to the bearing 34, and has a wrist pin 42 thereon which receives the bearing sleeve 43 upon one end of the pitman rod 44. A cross bar 45 is rigidly connected at opposite ends to the bars 36 and 39 of the hinged support frame.

A lug 46 is fixed upon the bar 36 of the hinged support frame and disposed toward the rear of the tractor and has an aperture 47 therein to receive a bolt 48 which is located through a corresponding aperture 49 in one end of the torsion bar 50, the other end of which is pivotally connected to the engine block or other stationary portion of the tractor as indicated at 51.

Thus the hinged support frame is flexibly supported upon the shaft or swing pin 27 and upon the torsion rod 50 so that it may freely move vertically so as to follow the contour of the ground as the tractor is moved thereover. This torsion bar takes the strain off of the shaft or swing pin 27 and relieves side draft.

The mower bar, indicated generally at 51a, may be of any conventional and well-known form and includes a guide plate 52 carried upon opposite ends by shoes 53 and 54 which slide upon the ground as in usual construction.

The adjacent ends of the bars 36 and 39 of the hinged support plate are pivotally connected to the shoe 53 as indicated at 55. The reciprocating element 56 of the mower bar is slidably abutted throughout its length by the guide plate 52 as in usual manner, and the adjacent end of the pitman rod 44 is pivotally connected to said sliding element as indicated at 57.

A plurality of sharp edged teeth 58 are secured to the reciprocating bar 56 and these teeth cooperate with the shearing surfaces upon the stationary teeth 59 to cut grass and the like as the mower bar is operated.

In the operation of the improved mower bar attachment, it will be seen that the same may be easily and readily attached to the housing 17 of the tractor by means of the four cap screws 23. As the tractor is moved forwardly, with the mower bar 51a resting upon the ground by sliding contact of the shoes 53 and 54 with the ground, it will be seen by an inspection of Fig. 3, that the entire mower bar is located at one side of the tractor, and that through the hinged support frame and torsion bar, the mower bar is flexibly supported so that either or both ends thereof may independently raise and lower so as to conform to the contour of the surface over which the mower bar is moved.

It will be seen that the torsion bar will carry a great part of the weight of the mower bar, taking the strain thereof off of the shaft 27, at the same time allowing complete flexibility of the hinged support frame and mower bar and functioning to maintain the tractor and mower bar in balanced position.

When it is desired to transport the tractor, with the mowing attachment thereon, the bolt 48 is removed and the hinged support frame is raised upon its pivot to substantially horizontal position, as shown in Figs. 1 and 2, positioning the lug 46 on the bar 36 between the spaced lugs 60 upon the rigid arm 61 which depends from the support plate 25, and pin 62 is located through the apertures 63 in the lugs 60 and the aperture 47 in the lug 46, holding the hinged support frame rigid in this position.

The mower bar 51a may then be swung upwardly to a vertical position, on its pivots 55, so that the tractor with mowing attachment may be easily transported.

From the above it will be seen that the improved mower bar attachment for tractors is simple and inexpensive to manufacture, having a minimum number of parts, and the same may be easily and readily attached to the tractor and detached therefrom.

The mower bar attachment is entirely flexible to follow the contour of the ground and at the same time is durable and strongly supported and well balanced and the operation is inexpensive since the mower bar attachment is driven entirely from the power take-off shaft of the tractor.

I claim:

1. A side operating mower bar attachment for a tractor having a rear power take-off shaft, said mower bar attachment comprising a housing, means rigidly attaching the housing to the tractor, a driven shaft in the housing axially connected to the power take-off shaft, a vertical plate rigidly connected to the housing, a swing pin shaft journalled upon said vertical plate, a support frame hingedly connected at one end to said swing pin shaft for vertical swinging movement relative thereto, a shoe for contact with the ground rigidly connected to said hinged support frame below said swing pin shaft, a mower bar hingedly connected at one end to the other end of said support frame for vertical swinging movement relative thereto, means operatively connecting the driven shaft and the swing pin shaft and means operatively connecting the swing pin shaft to the mower bar.

2. A side operating mower bar attachment for a tractor having a rear power take-off shaft, said mower bar attachment comprising a housing, means rigidly attaching the housing to the tractor, a driven shaft in the housing axially connected to the power take-off shaft, a vertical plate rigidly connected to the housing, a swing pin shaft journalled upon said vertical plate, a support frame hingedly connected at one end to said swing pin shaft for vertical swinging movement relative thereto, a shoe for contact with the ground rigidly connected to said hinged support frame below said swing pin shaft, a mower bar hingedly connected at one end to the other end of said support frame for vertical swinging movement relative thereto, a reciprocating cutting element on the mower bar, pulleys upon the driven shaft and the swing pin shaft, a belt operatively connecting said pulleys, a pitman wheel upon the swing pin shaft, and a pitman rod connecting said pitman wheel to the reciprocating cutting element.

3. A side operating mower bar attachment for a tractor having a rear power take-off shaft, said mower bar attachment comprising a housing, means rigidly attaching the housing to the tractor, a driven shaft in the housing axially operatively connected to the power take-off shaft, a vertical plate rigidly connected to the housing, a swing pin shaft journalled upon said vertical plate, a support frame comprising a bar hingedly connected at one end to said swing pin shaft for vertical swinging movement relative thereto, a shoe rigidly connected to said bar below said swing pin shaft, a bar rigidly connected at one end to the shoe and located parallel to said hingedly connected bar, a mower bar hingedly connected at one end to the other end of said support frame for vertical swinging movement relative thereto, means operatively connecting the driven shaft and the swing pin shaft, and means operatively connecting the swing pin shaft to the mower bar.

4. A side operating mower bar attachment for a tractor having a rear power take-off shaft, said mower bar attachment comprising a housing, means rigidly attaching the housing to the tractor, a driven shaft in the housing axially operatively connected to the power take-off shaft, a vertical plate rigidly connected to the housing, a swing pin shaft journalled upon said vertical plate, a support frame comprising a bar hingedly connected at one end to said swing pin shaft for vertical swinging movement relative thereto, a shoe rigidly connected to said bar below said swing pin shaft, a bar rigidly connected at one end to the shoe and located parallel to said hingedly connected bar, a mower bar hingedly connected at one end to the other end of said support frame for vertical swinging movement relative thereto, a reciprocating cutting element in the mower bar, pulleys upon the driven shaft and the swing pin shaft, a belt operatively connecting said pulleys, a pitman wheel upon the swing pin shaft and a pitman rod connecting said pitman wheel to the reciprocating cutting element.

5. A side operating mower bar attachment for a tractor having a rear power take-off shaft, said mower bar attachment comprising a housing, means rigidly attaching the housing to the tractor, a driven shaft in the housing axially connected to the power take-off shaft, a vertical plate rigidly connected to the housing, a swing pin shaft journalled upon said vertical plate, a support frame hingedly connected at one end to said swing pin shaft for vertical swinging movement relative thereto, a shoe for contact with the ground rigidly connected to said hinged support frame below said swing pin shaft, a mower bar hingedly connected at one end to the other end of said support frame for vertical swinging movement relative thereto, means operatively connecting the driven shaft and the swing pin shaft and means operatively connecting the swing pin shaft to the mower bar, a torsion bar located at substantially right angles to the hinged support frame and pivotally connected at opposite ends to the tractor and to the hinged support frame.

6. A side operating mower bar attachment for a tractor having a rear power take-off shaft, said mower bar attachment comprising a housing, means rigidly attaching the housing to the tractor, a driven shaft in the housing axially operatively connected to the power take-off shaft, a vertical plate rigidly connected to the housing, a swing pin shaft journalled upon said vertical plate, a support frame comprising a bar hingedly connected at one end to said swing pin shaft for vertical swinging movement relative thereto, a shoe rigidly connected to said bar below said swing pin shaft, a bar rigidly connected at one end to the shoe and located parallel to said hingedly connected bar, a mower bar hingedly connected at one end to the other end of said support frame for vertical swinging movement relative thereto, means operatively connecting the driven shaft and the swing pin shaft, and means operatively connecting the swing pin shaft to the mower bar, a torsion bar located at substantially right angles to the hinged support frame and pivotally connected at opposite ends to the tractor and to the hinged support frame.

EARL L. GRATE.

REFERENCES CITED

The following references are of record in the file of this patent:

UNITED STATES PATENTS

| Number | Name | Date |
| --- | --- | --- |
| 1,459,998 | Simmons | June 26, 1923 |
| 1,911,388 | Pearson | May 30, 1933 |
| 1,947,552 | Huddle | Feb. 20, 1934 |
| 2,155,716 | Korsmo et al. | Apr. 25, 1939 |